(12) United States Patent
Karem (10) Patent No.: US 8,128,376 B2
(45) Date of Patent: Mar. 6, 2012

(54) HIGH PERFORMANCE OUTBOARD SECTION FOR ROTOR BLADES

(76) Inventor: Abe Karem, Tustin, CA (US)

( * ) Notice: Subject to any disclaimer, the term of this patent is extended or adjusted under 35 U.S.C. 154(b) by 1331 days.

(21) Appl. No.: 11/505,157

(22) Filed: Aug. 15, 2006

(65) Prior Publication Data

US 2010/0272576 A1   Oct. 28, 2010

Related U.S. Application Data (60) Provisional application No. 60/708,597, filed on Aug. 15, 2005.

(51) Int. Cl.
*B64C 27/467* (2006.01)

(52) U.S. Cl. .................. 416/228; 416/238; 416/241 R (58) Field of Classification Search .................. 416/238, 416/241 R, 241 A, 228
See application file for complete search history.

(56) References Cited

U.S. PATENT DOCUMENTS

| | | | |
|---|---|---|---|
| 3,822,105 A | | 7/1974 | Jepson |
| 5,181,678 A | * | 1/1993 | Widnall et al. ............... 244/219 |
| 6,116,857 A | * | 9/2000 | Splettstoesser et al. ...... 416/228 |
| 6,190,132 B1 | * | 2/2001 | Yamakawa et al. ........... 416/228 |
| 6,231,308 B1 | | 5/2001 | Kondo et al. |
| 6,364,615 B1 | | 4/2002 | Toulmay et al. |
| 6,503,058 B1 | | 1/2003 | Selig et al. |
| 6,976,829 B2 | * | 12/2005 | Kovalsky et al. ............. 416/226 |
| 2005/0144064 A1 | | 6/2005 | Calabria et al. |
| 2005/0158175 A1 | | 7/2005 | Falchero et al. |

OTHER PUBLICATIONS

Taverna, Michael A., "Eurocopter Blade Production Offers Competitive Boost", Aviation Week & Space Technology, Jun. 13, 2005, p. 167, The McGraw-Hill Companies, US.

* cited by examiner

*Primary Examiner* — Ninh H Nguyen
(74) *Attorney, Agent, or Firm* — Fish & Associates, PC (57) ABSTRACT

Blades for rotorcraft are designed and/or implemented with rotor blades having a swept portion that occupies at least 20-40% of a length of the blade. Forward and aft sweeps are contemplated, with up to 20° or more of sweep. The swept portion preferably has a thickness ration of at least 10-20% at R80, and can have a tapered planform with a relatively outboard section having a smaller chord than a relatively inboard section. Contemplated design methods include optimizing or otherwise designing the rotor blade planform and lift distribution along the blade for efficiency in various flight conditions without taking into account the detrimental effects of high Mach numbers, and then using sweep angle, airfoil thickness and transonic airfoil shaping to maintain the lift distribution, low drag and low noise level at real Mach numbers at the various blade stations at the various flight conditions.

15 Claims, 7 Drawing Sheets

HIGH PERFORMANCE OUTBOARD SECTION FOR ROTOR BLADES

This application claims priority to U.S. Provisional Application Ser. No. 60/708,597 filed Aug. 15, 2005.

FIELD OF THE INVENTION

The field of the invention is rotorcraft.

BACKGROUND OF THE INVENTION

Most medium size and large rotorcraft have high ratio of maximum weight to rotor disc area, such ratio is called disc loading in the aeronautical vernacular.

In order to generate the high required lift from the limited disc area, rotors of such rotorcraft turn at angular velocity (RPM) which causes the blade tips at hover at sea level to be close to 70% the speed of sound (Mach 0.7 in the aeronautical vernacular). Flying at higher altitude and/or at forward speed brings the tip speed closer to Mach 1.

As any section of a rotor travels above Mach 0.7 and approaches Mach 1, transonic flow phenomena limit the maximum section lift, create shock waves, substantially increase rotor noise level, decrease rotor efficiency and/or cause oscillatory rotor loads and rotorcraft vibrations.

To delay the onset of these negative results, some of these rotors use thin airfoils, reduced tip lift coefficient and swept back tip in the outboard 10% of the blade radius (from R90 to R100 in the rotorcraft vernacular). Additionally, to further delay the onset of these results rotorcraft with highly loaded rotors often require wider blades and/or additional blades (e.g. five blades instead of four), the former decreases rotor efficiency and both measures increase rotorcraft empty weight.

As an example, the Sikorsky UH-60 Blackhawk and S-92 have swept tip main rotor blades, and there are reports in the literature extolling the virtues of such blades in reducing noise and vibration, and improving performance. See e.g., http://www.vtol.org/pdf/airc-60.pdf; and http://www.ainonline.com/Publications/HAI/HAI_2002/HAI_02d1_stcpendingpg2.html. These and all other referenced extrinsic materials are incorporated herein by reference in their entirety.

Surprisingly, however, it appears that no one has appreciated that it would be beneficial to increase the proportion of the blade that is swept beyond about 10%. Thus, there is still a need to provide further increases in efficiency through use of blades having relatively larger swept back portions.

SUMMARY OF THE INVENTION

The present invention provides apparatus and methods in which rotorcraft are designed and/or implemented with rotor blades having a swept portion that occupies at least 20% of a length (span) of the blade. In one aspect of preferred embodiments, the swept portion occupies at least 30% of the length of the blade, and in some instances may occupy up to 40% or more of the length of the blade.

All viable configurations of the swept portion are contemplated. For example, the swept portion can have a leading edge sweep angle of up to 20°, 25°, 30° or more, and can even vary along the swept portion. Independently of the sweep angle, the blades can be have a forward or backward sweep, and can even include both forward and backward sweeps. Still further, the swept portion preferably has a thickness ration of at least 10% at R80, more preferably at least 15% at R80, and still more preferably at least 20% at R80. Still further, the blade can have a tapered planform with a relatively outboard section having a smaller chord than a relatively inboard section.

A highly preferred embodiment is that of a rotor blade of a tilt-rotor rotorcraft such as the Bell-Boeing V-22. Such rotor must achieve both a high Figure of Merit in hover flight and a high propulsive efficiency in cruise flight when in airplane mode.

Contemplated methods include the steps of: (a) receiving information that efficiency can be improved with use of the inventive blades as discussed above; and then (b) provisioning (i.e., designing, manufacturing, fitting, and/or retrofitting) rotorcraft with one or more of such blades. Such information can be received internally, from a company's own designers and other agents, or externally from competitors or others. As used herein, the concept of improved efficiency relates to improvement by at least 5%-10%, with respect to same length blades having a swept back tip in only the outboard 10% of the blade, in at least one of (a) lift in highly loaded rotors, especially at higher altitudes and at forward speed; (b) higher hover efficiency (higher hover figure of merit); (c) increased maximum take-off weight; and (d) reduced rotor loads and rotorcraft noise and vibration, especially at high forward speed.

From another perspective, other contemplated methods allow for optimization of the rotor blade planform (plan view) and the lift distribution along the blade for best efficiency in the various flight conditions of the rotor application, without taking into account the detrimental effects of the high Mach numbers of the outer section of the blade. Only after such blade shape optimization, the combination of sweep angle, airfoil thickness and transonic airfoil shaping are used to maintain the lift distribution, low drag and low noise level at the real Mach numbers at the various blade stations at the various flight conditions.

Among other things, the inventive subject matter provides for improved lift distribution along the blade from R60 to R100 by combining the variation of sweep angle, airfoil thickness and airfoil shape. The improved lift distribution provides any desired combination of higher rotor lift, reduced drag and reduced rotor size and weight.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
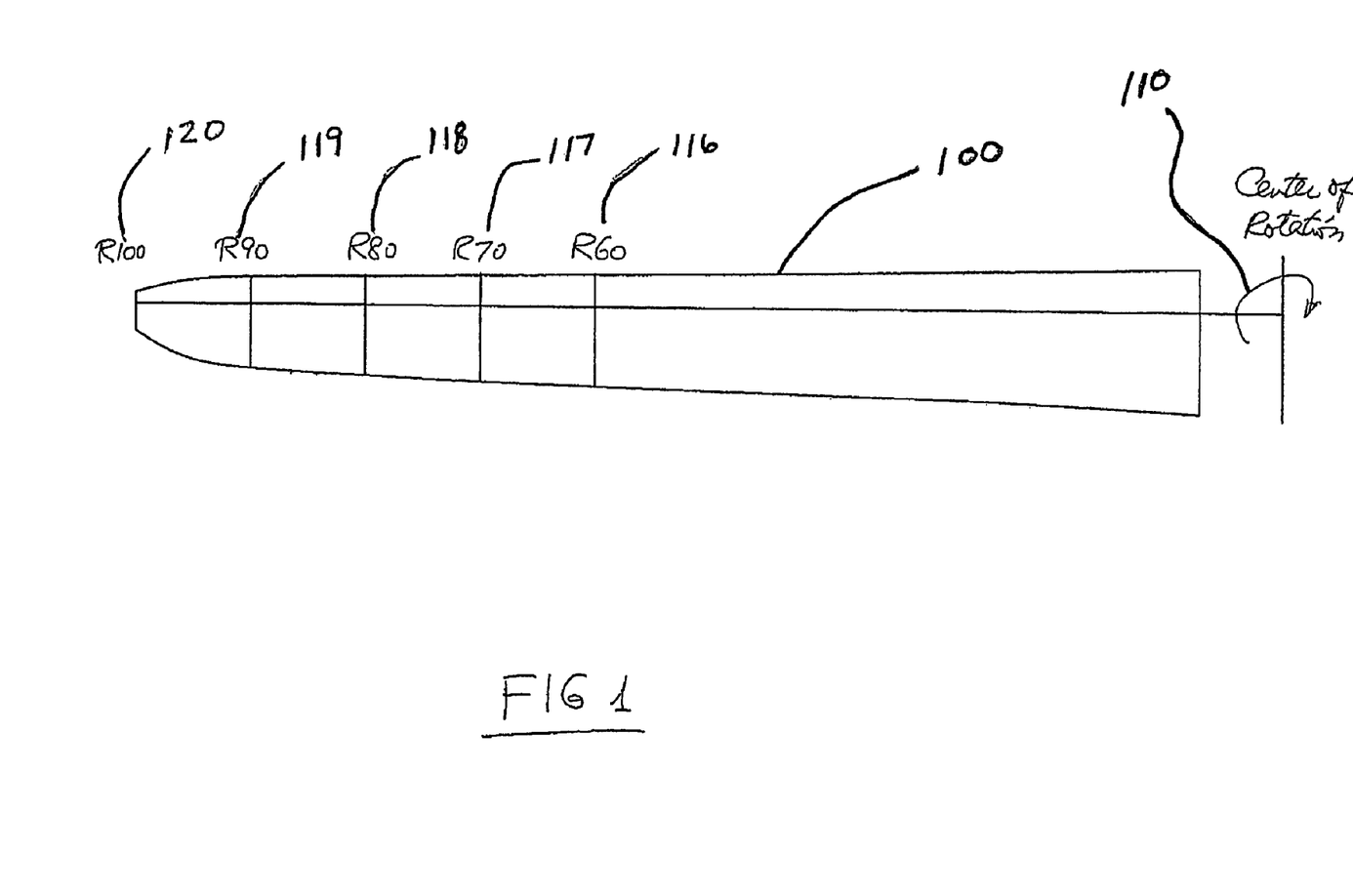
FIG. 1 is a prior art plan view of a rotor blade designed for optimum lift distribution for a certain application.

In FIG. 1, a rotor blade 100 has a center of rotation 110, and the Figure is marked 116-120 to designate percentage distances from the center of rotation of the blade to the tip. In accordance with one class of novel methods disclosed herein, whereby the blade was designed without taking into account the detrimental effects of the high Mach numbers on the blade from R63 to R100. The result is a blade that would hover at sea level at maximum RPM with a tip Mach number of only 0.72, the tip Mach number of the advancing blade at maximum forward speed in helicopter mode would be 0.9, and at R70 for the same conditions would be 0.68. These Mach numbers are excessive for efficient rotor operation and low noise level at the desired lift coefficients, and with the desired airfoil thicknesses of 15% at R70 and 10% at R100.

Figure 2:
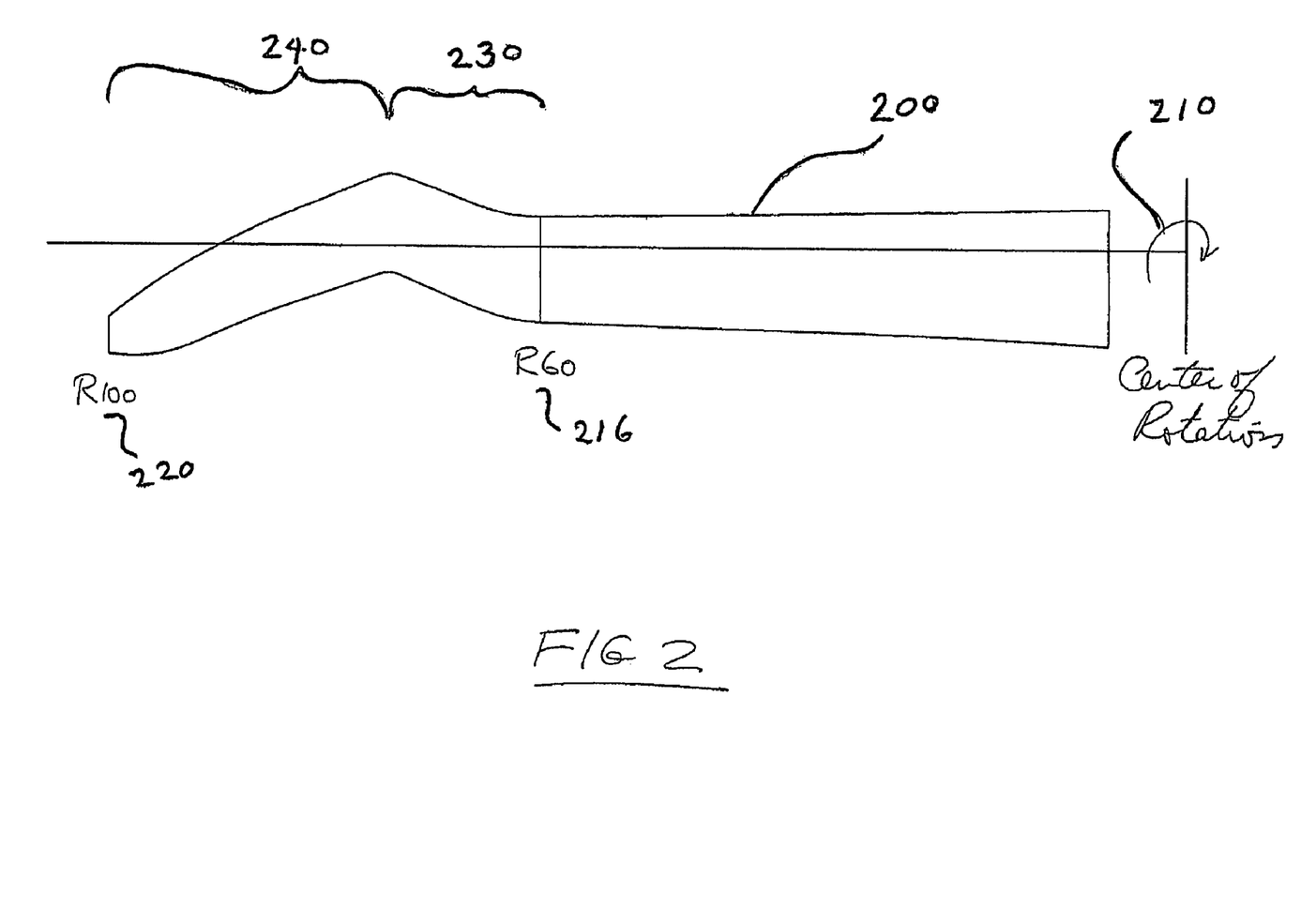
FIG. 2 is a plan view of the preferred embodiment rotor blade, having the same blade chord distribution and lift distribution along the blade as those for the blade in FIG. 1.

In FIG. 2, the blade design of FIG. 1 is modified to include forward swept 230 and aft swept 240 portions, which together provide a swept portion of at least 40% of the blade length (i.e. from the R60 position 216 to the very tip R100 of the blade, designated by 220. In accordance with the preferred class of methods discussed above, this blade planform retains the blade chord distribution along the blade, the lift distribution and therefore the lift coefficient distribution of the blade in FIG. 1, which was optimized for best overall performance when disregarding the effect of Mach number. Although all of the figures are intended to be drawn approximately to scale for a given embodiment, it should be appreciated that the design of the swept section (extent, planform shape, etc) are emblematic in the figures. Thus, for example, although the outward most swept portion 240 could be measured to show an approximately 20° of sweep, the figure should be interpreted as including all reasonably contemplated variations in keeping with the inventive concepts herein, and should therefore also include a sweep of 20°, 25°, and even 30° or more.

Figure 3:
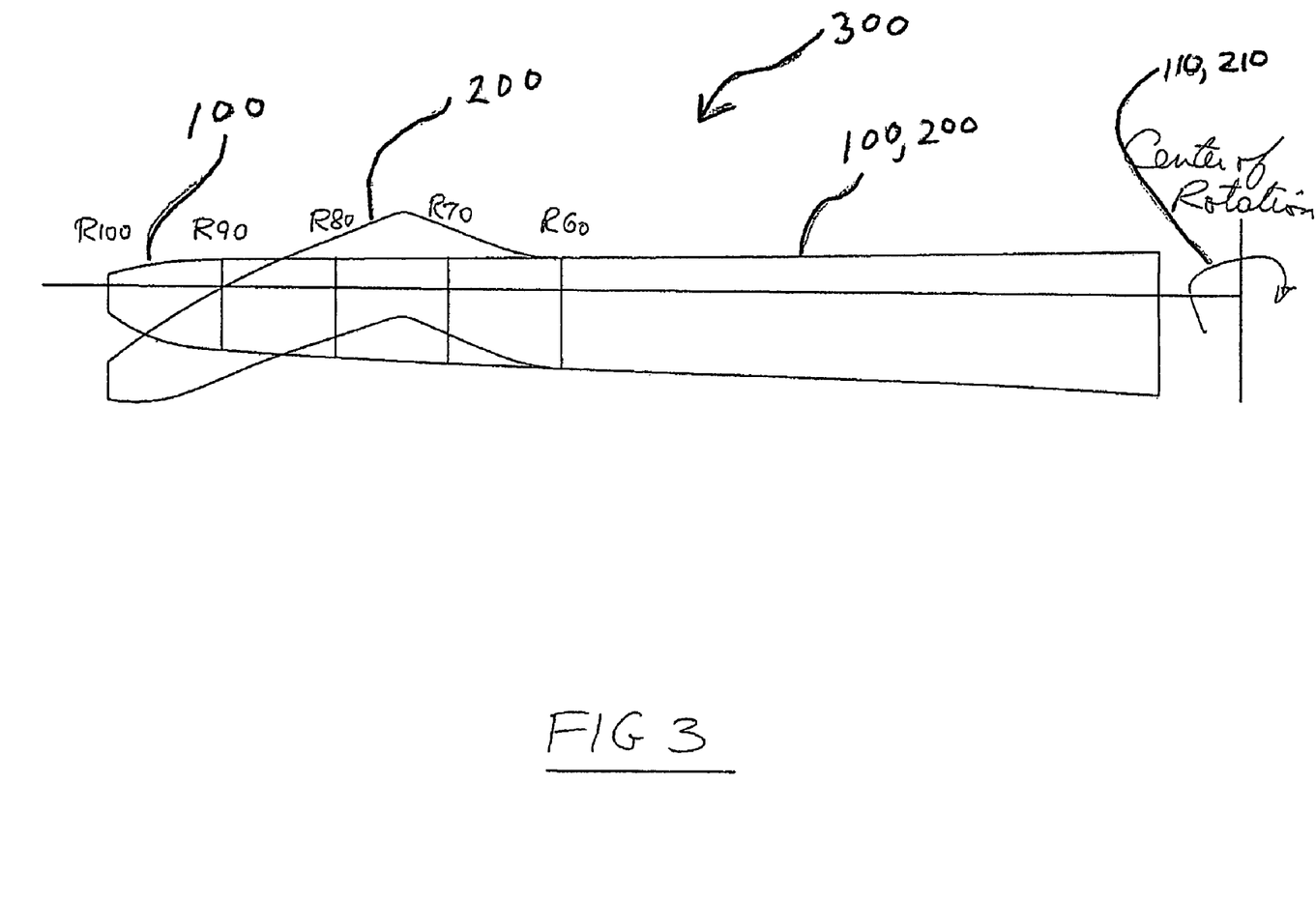
FIG. 3 is a chart comparing the planform in FIG. 2 to the planform in FIG. 1.

FIG. 3 presents a comparison 300 of the preferred embodiment planform 200 to the design blade 100 in FIG. 1.

Figure 4:
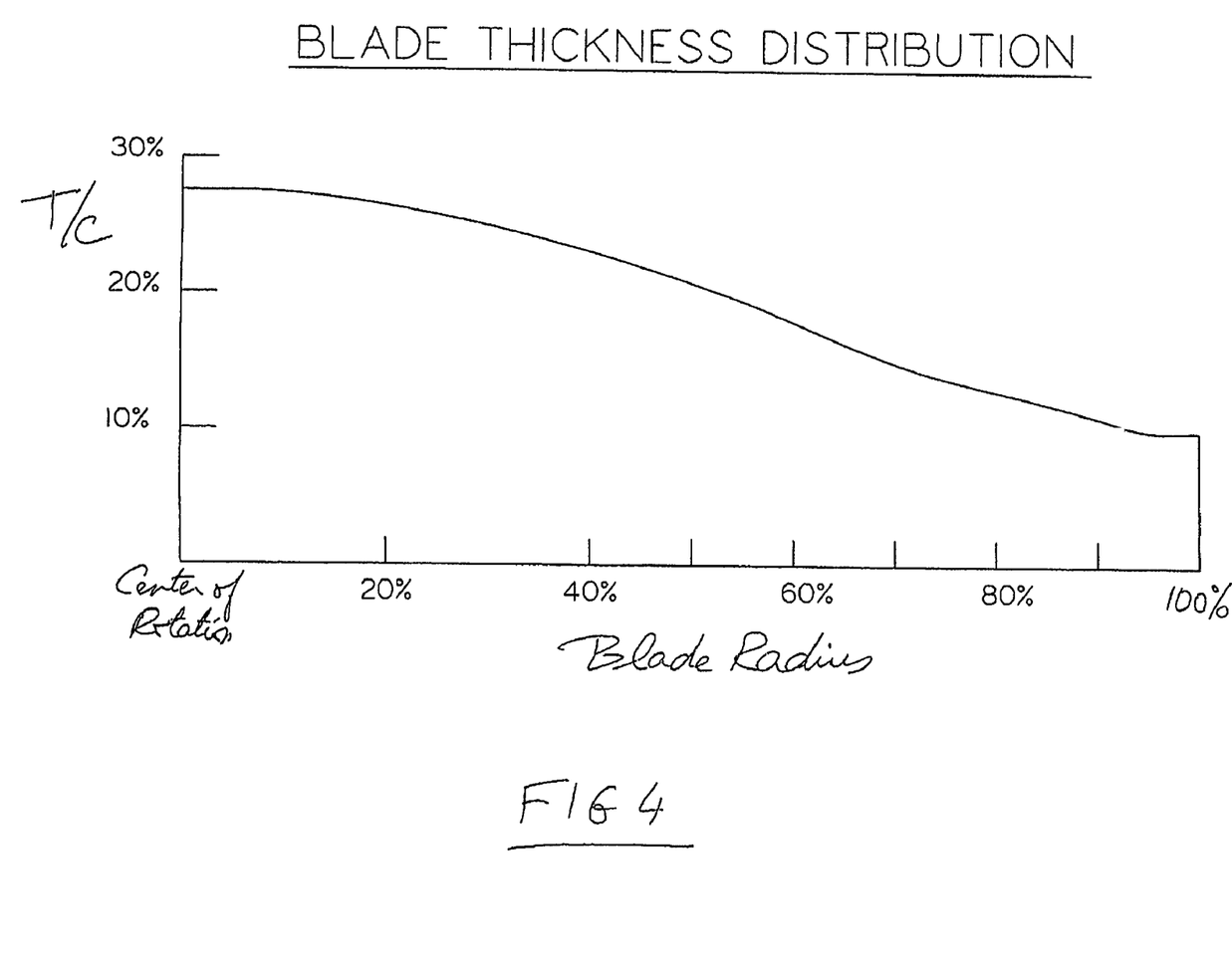
FIG. 4 is a chart of blade thickness distribution along the blade of the preferred embodiment rotor blade.

FIG. 4 is a chart of blade thickness distribution of the preferred embodiment blade, developed by iterations of transonic airfoil designs using Computational Fluid Dynamics (CFD) methods, local blade sweep angle and blade thickness for selected blade stations at the real Mach numbers and the various flight conditions. The designation "T/C' refers to the ratio of the local blade thickness to the local blade chord. This iteration process can produce thicker airfoils with higher sweep angles and the current selection is, therefore, a result of structural considerations and structural dynamics analysis using computational methods such as Finite Element Analysis (FEA), advanced composites analysis and Wayne Johnson's CAMRAD II.

Figure 5:
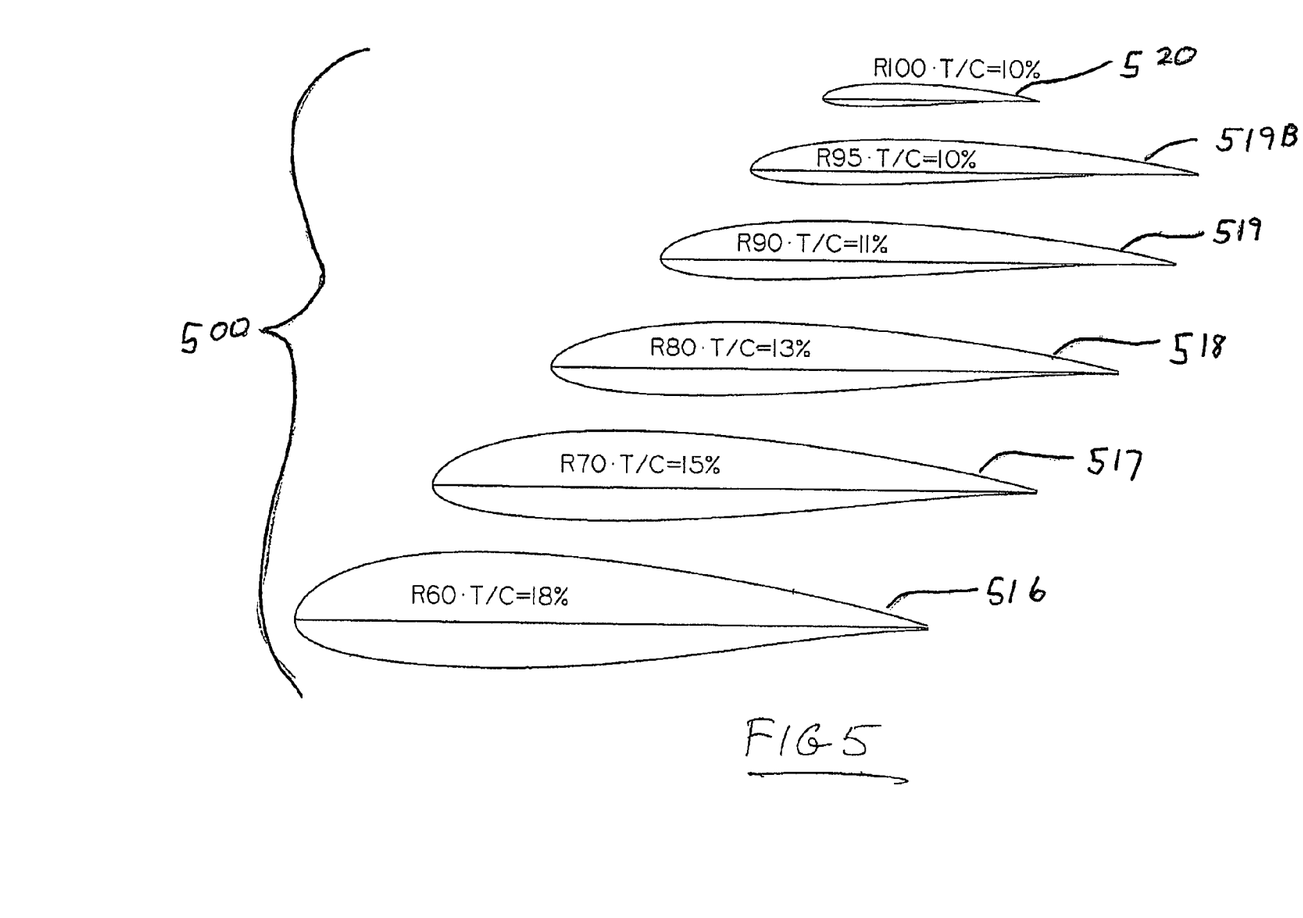
FIG. 5 is a chart of the transonic airfoils selected for the outboard section of the preferred embodiment rotor blade.

FIG. 5 is a chart 500 of exemplary transonic airfoils 516, 517, 518, 519, 519B, 520, developed as modifications of the preferred embodiment blade of FIG. 1. Although starting blade sweep at R63 is currently preferred, it is contemplated that such blade sweep can start at 75%, more preferably at 65%, and still more preferably at 55%.

Figure 6:
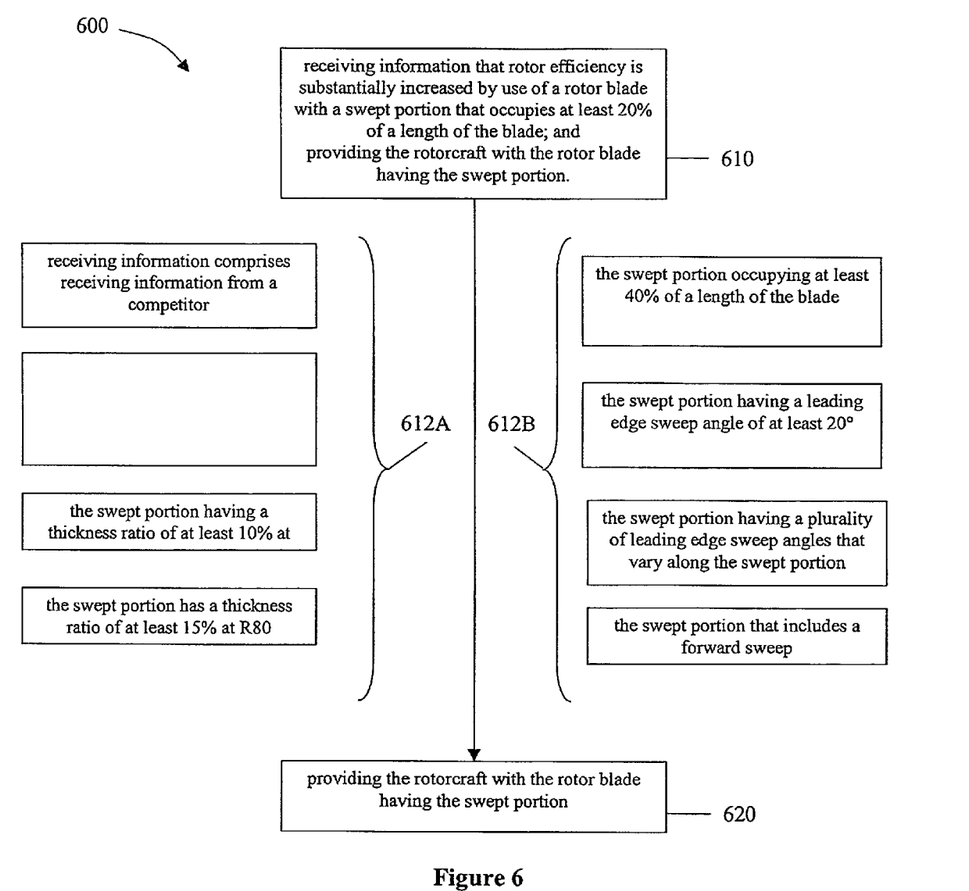
FIG. 6 is a diagram of steps in a class of preferred methods.

FIG. 6 is a schematic of steps in a class of inventive methods 600, which include step 610—providing the rotorcraft with the rotor blade having the swept portion and step 620—providing the rotorcraft with the rotor blade having the swept portion. Optional steps include those collectively designated as 612A—receiving information comprises receiving information from a competitor; the blade having a tapered planform with a relatively outboard section having a smaller chord than a relatively inboard section; the swept portion having a thickness ratio of at least 10% at R80; and the swept portion has a thickness ratio of at least 15% at R80. Further optional steps include those collectively designated as 612B—the swept portion occupying at least 40% of a length of the blade; the swept portion having a leading edge sweep angle of at least 20°; the swept portion having a plurality of leading edge sweep angles that vary along the swept portion; the swept portion that includes a forward sweep.

Figure 7:
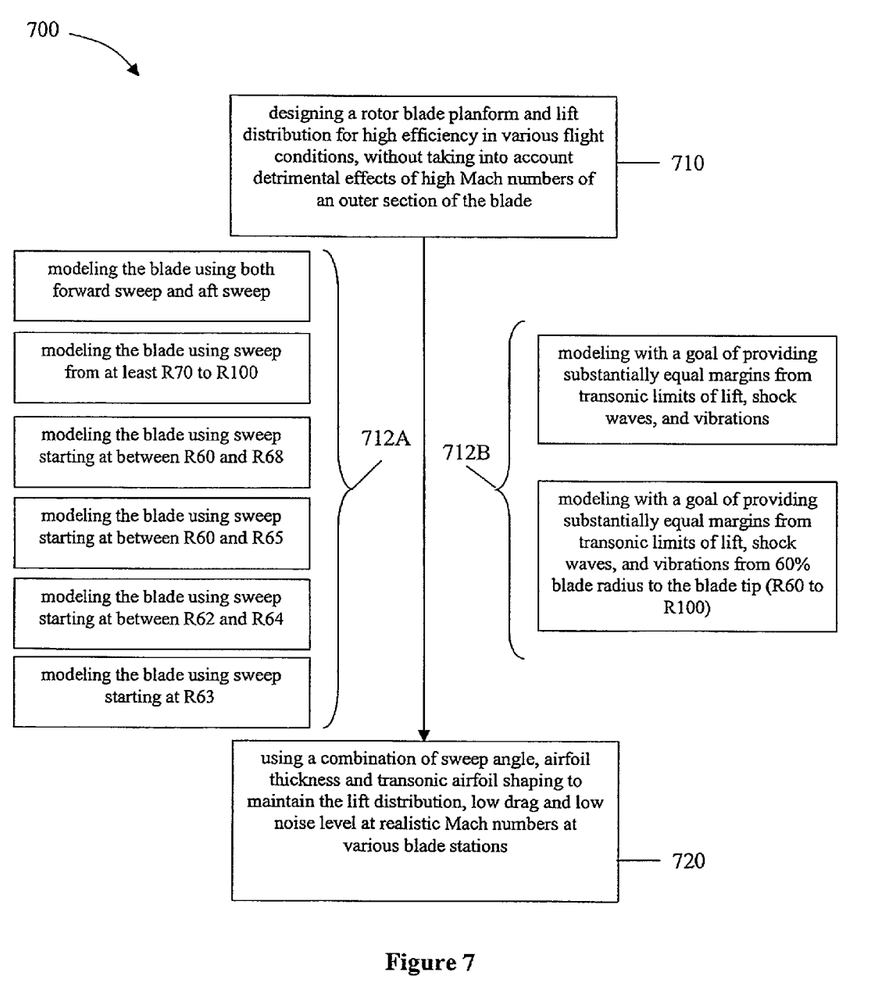
FIG. 7 is a diagram of steps in another class of preferred methods.

In FIG. 7, another class of inventive methods 700 includes steps 710—designing a rotor blade planform (plan view) and lift distribution for high efficiency in various flight conditions of the rotor application, without taking into account the detrimental effects of the high Mach numbers of the outer section of the blade; and then step 720 using a combination of sweep angle, airfoil thickness and transonic airfoil shaping to maintain the lift distribution, low drag and low noise level at the real Mach numbers at the various blade stations at the various flight conditions. Step 720 can be performed iteratively, as discussed above with respect to FIGS. 4 and 5.

Performing these steps in specific examples have demonstrated that rotor blades with a proportion of sweep can advantageously use both forward sweep and aft sweep, and that it is highly preferred for the blade to be designed to be swept in some manner from at least R70 to R100, and more preferably starting at between R60 and R68, still more preferably starting at between R60 and R65, still more preferably starting at between R62 and R64, and most preferably starting at R63. Such design steps are collectively designated 712A in FIG. 7.

It has also been established using the inventive methods that rotor blade planform and aerodynamic designs can advantageously be selected to provide substantially equal margins from all transonic limits (lift, shock waves, vibrations, etc.) from 60% blade radius to the blade tip (R60 to R100). The term "substantially equal margins" is used herein to mean that such margins are maintained from R60 to R100 when flight parameters and conditions (such as weight, altitude and airspeed) are varied. These design steps are collectively designated 712B in FIG. 7.

Using these steps it has been discovered that such aerodynamic shaping offers significant improvements in the percentage of laminar boundary layer (low drag) comparable to that of the unswept blade. Blades deigned or otherwise provisioned according the inventive concepts described herein can provide substantial increase in lift in highly loaded rotors, especially at higher altitudes and at forward speed. Implementations of the inventive concepts can also reduce shock waves, rotor noise level, blade oscillatory loads and rotorcraft vibration. In still other aspects, modeling has shown that, implementations of the inventive subject matter can provide higher hover efficiency (higher hover figure of merit), resulting in increased maximum take-off weight which when combined with reduced empty weight (no need for wider blades or additional blades) offer higher payload and range. The substantial increase in rotor efficiency at the higher altitude and at forward speed provided by the inventive subject matter, when implemented without increase in blade area or adding more blades, also offers reduction in required engine power and transmission torque, lower fuel consumption and rotorcraft empty weight, longer engine and transmission life and lower in-flight failure rates of the rotor, transmission and engine. By sweeping the blade starting from R63 (instead of R90 in some prior art), one can use thicker blade airfoils in the section of the between R65 and R90 which is most important for high rotor lift and low drag. The thicker airfoils allow for higher blade stiffness in bending and in torsion and lower blade weight required by some types of rotors. Thus, still other aspects contemplated here include designing blades to achieve any one or any combination of these benefits.

From a structural standpoint it should be appreciated that the inventive concepts discussed herein can be applied to blades of any suitable material. Thus, while the inventive concepts can be applied to metal blades, and also more preferably to high- and medium-modulus carbon-epoxy composites, used to achieve the desired blade structural characteristics. The use of high or medium modulus of elasticity carbon fiber composites provides the stiffness required for flutter-free compound sweep thin blade at high dynamic pressure.

Thus, specific embodiments, applications, and methods have been disclosed in which rotor blades have high performance outboard sections. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A rotorcraft, comprising:
a composite rotor blade having a swept portion that
(a) occupies at least 20% of a length of the blade;
(b) has a leading edge sweep angle of at least 20°; and
(c) includes a single forward sweep;
wherein the blade has a tapered planform with a relatively outboard section having a smaller chord than a relatively inboard section, such that the chord at R90 is at most 81% of the chord at R60.

2. The rotorcraft of claim 1, wherein the blade uses at least one of a high- and medium-modulus carbon-epoxy composite.

3. The rotorcraft of claim 1, wherein the swept portion that occupies at least 30% of a length of the blade.

4. The rotorcraft of claim 1, wherein the swept portion that occupies at least 40% of a length of the blade.

5. The rotorcraft of claim 1, wherein the swept portion has a leading edge sweep angle of at least 25°.

6. The rotorcraft of claim 1, wherein the swept portion has a plurality of leading edge sweep angles that vary along the swept portion.

7. The rotorcraft of claim 6, wherein the plurality of leading edge sweep angles include at least some forward sweep angles.

8. The rotorcraft of claim 1, wherein the swept portion has a thickness ratio of at least 13% at R80.

9. The rotorcraft of claim 1, wherein the swept portion has a thickness ratio of at least 15% at R80.

10. The rotorcraft of claim 1, wherein the swept portion has a thickness ratio of at least 10% at R80.

11. The rotorcraft of claim 1, wherein the swept portion has a thickness ratio of at least 15% at R80.

12. A method of developing a blade for a rotorcraft, comprising:
designing a rotor blade planform and lift distribution for high efficiency in various flight conditions, without taking into account detrimental effects of high Mach numbers of an outer section of the blade; and using a combination of sweep angle, airfoil thickness and transonic airfoil shaping to maintain the lift distribution, low drag and low noise level at realistic Mach numbers at various blade stations; and provisioning a rotorcraft with one or more of such blades.

13. The method of claim 12, modeling with a goal of providing substantially equal margins from transonic limits of lift, shock waves, and vibrations.

14. The method of claim 12, modeling the blade using both forward sweep and aft sweep.

15. The method of claim 12, modeling the blade using sweep from at least R70 to R100.

* * * * *